United States Patent
Humphries (10) Patent No.: US 7,988,096 B2
(45) Date of Patent: Aug. 2, 2011

(54) SPACE MANUFACTURING MODULE SYSTEM AND METHOD

(76) Inventor: Peter J. Humphries, San Jose, CA (US)

( * ) Notice: Subject to any disclaimer, the term of this patent is extended or adjusted under 35 U.S.C. 154(b) by 676 days.

(21) Appl. No.: 11/217,649

(22) Filed: Sep. 1, 2005

(65) Prior Publication Data

US 2007/0063104 A1 Mar. 22, 2007

Related U.S. Application Data

(60) Provisional application No. 60/606,410, filed on Sep. 1, 2004.

(51) Int. Cl.
*B64G 1/00* (2006.01)
(52) U.S. Cl. .................................. 244/158.1
(58) Field of Classification Search .............. 244/158.1, 244/159.4, 171.9, 173.1, 172.6; 29/897.2, 29/407.01, 407.1; 700/97, 98, 182, 118
See application file for complete search history.

(56) References Cited

U.S. PATENT DOCUMENTS

| | | | | |
|---|---|---|---|---|
| 4,094,055 A | * | 6/1978 | Morimoto | 29/527.6 |
| 4,132,373 A | | 1/1979 | Lang | 244/159 |
| 4,273,305 A | * | 6/1981 | Hinds | 244/172.5 |
| 4,281,615 A | * | 8/1981 | Wilson et al. | 114/265 |
| 4,643,375 A | | 2/1987 | Allen | 244/159 |
| 4,681,054 A | * | 7/1987 | Rice et al. | 114/124 |
| 4,715,566 A | | 12/1987 | Nobles | 244/159 |
| 4,744,533 A | | 5/1988 | Mullen | 244/159 |
| 4,805,368 A | | 2/1989 | Wesselski | 52/573 |
| 4,834,000 A | | 5/1989 | Darnell et al. | 108/51.1 |
| 4,872,625 A | | 10/1989 | Filley | 244/159 |
| 5,050,821 A | | 9/1991 | Kerstein et al. | 244/158 R |
| 5,070,655 A | * | 12/1991 | Aggarwal | 451/5 |
| 5,116,180 A | | 5/1992 | Fung et al. | 414/5 |
| 5,145,130 A | | 9/1992 | Purves | 244/159 |
| 5,429,328 A | * | 7/1995 | Dobbs et al. | 244/172.5 |
| 5,580,013 A | | 12/1996 | Velke | 244/159 |
| 5,601,258 A | * | 2/1997 | McClymonds | 244/171.7 |
| 5,693,157 A | * | 12/1997 | Kingston | 148/537 |
| 5,736,073 A | * | 4/1998 | Wadley et al. | 264/10 |
| 5,791,600 A | | 8/1998 | Thompson | 244/159 |
| 5,848,766 A | | 12/1998 | Thompson | 244/158 R |
| 6,108,983 A | * | 8/2000 | Dewald et al. | 52/67 |
| 6,148,740 A | | 11/2000 | Jackel et al. | 108/57.32 |
| 6,239,767 B1 | | 5/2001 | Rossi et al. | 343/882 |
| 6,439,508 B1 | * | 8/2002 | Taylor | 244/158.3 |
| 6,574,520 B1 | | 6/2003 | Liu et al. | 700/96 |
| 6,866,232 B1 | * | 3/2005 | Finney | 244/172.4 |
| 6,992,818 B2 | * | 1/2006 | Betin et al. | 359/338 |

(Continued)

OTHER PUBLICATIONS

STS Robotic Arm PDF, JAXA, Sep. 20, 2000.*

(Continued)

*Primary Examiner* — Tien Dinh
*Assistant Examiner* — Philip J Bonzell
(74) *Attorney, Agent, or Firm* — Schneck & Schneck; Thomas Schneck (57) ABSTRACT

A space based manufacturing system including a control module and a manufacturing module. The manufacturing module contains the tools required for automated processing of materials into finalized components. The control module allows command and control of the manufacturing module as well as communication with earth based systems. For component manufacture, the component requiring manufacture is identified in space, designed and engineered on earth, and manufactured in space using computer integrated manufacturing to tie these processes together. The astronaut in the control module monitors the safety of the manufacturing operation and may control manufacturing in real time.

14 Claims, 6 Drawing Sheets

U.S. PATENT DOCUMENTS

| | | | | |
|---|---|---|---|---|
| 6,995,334 | B1* | 2/2006 | Kovacevic et al. | 219/121.63 |
| 7,103,434 | B2* | 9/2006 | Chernyak et al. | 700/98 |
| 2002/0165637 | A1* | 11/2002 | Dillon | 700/162 |
| 2004/0053476 | A1* | 3/2004 | Sotani et al. | 438/463 |
| 2006/0145024 | A1* | 7/2006 | Kosmas | 244/172.5 |

OTHER PUBLICATIONS

Ropotic Arm Picture PDF, JAXA Sep. 20, 2000.*

Payload Deplorment and Retrieval System (PDRS), section 2.19 of the Shuttle Press Kit, Mar. 10, 2003. http://web.archive.org/web/20030310124351/http://www.shuttlepresskit.com/scom/219.pdf.*

"International Space Station", http://www.nasa.gov/mission_pages/station/structure/index.html.*

"STS-98" (http://web.archive.org/web/20030202094329/http://spaceflight.nasa.gov/shuttle/archives/sts-98/).*

Website printout: "NASA Gets a New Fix on Problems", http://www.wired.com/news/print/ 0,1294, 50552,00.html 3 pages.

Website printout: "Former Astronaut Don Peterson's Ideas for Future Human Flight Programs", http://www.spaceref.com/news/viewnews.html?id=953, 6 pgs. May 20, 2004.

Website printout: "Computer Integration Engineering Design and Production: A National Opportunity", http://www.nap.edu/execsumm/POD215.html, 9 pages, 1984.

Website printout: "Space Modular Systems", http://www.fas.org/spp/military/docops/usaf/2020/ app-k.htm, 15 pages, Sep. 10, 2004.

Website printout: "Computers in Engineering", http://www/sae.org/aeromag/compengineering/04-2001/, 11 pages, Apr. 2001.

Website printout: "Modular Technology for Space, or Why Can't we Build Spaceships out of Lego Blocks?", http://www.tgv-rockets.com/ spaceequity110200.htm, 6 pages, Jan. 17, 2000.

Website printout: "Safe Passage: Astronaut Care for Exploration Missions", http://books.nap.edu/books/ 0309075858/html/124.html, 4 pages, 2001.

Printout: "Operations Technology", Supplement C, cha06369_supC.gxd, pp. 728-735, Feb. 28, 2003.

Wm. Whittaker et al., "Skyworker-Assembly, Inspection and Maintenance of Space Solar Power Facilities", The Robotics Institute, Pittsburgh: Carnegie Mellon University, Dec. 8, 1999.

Wm. Whittaker et al., "Skyworker—A Robot for Assembly, Inspection and Maintenance of Large Scale Orbital Facilities", IEEE, Pittsburgh: Carnegie Mellon University, May 2001, pp. 4180-4185.

S. Skaff et al., "Skyworker: Robotics for Space Assembly, Inspection and Maintenance", Carnegie Mellon University, Robotics Institute, Jul. 2001, 5 pages.

Website printout: "Laser Processing Basics—How Lasers Work", http://www.lasermachining.com/ applications/processes/cutting.html, Dec. 2001, 3 pages.

D.V. Smitherman, Jr., "New Space Industries for the Next Millennium", Marshall Space Flight Center, Alabama, Dec. 1998, 20 pages.

E. Lorenzini et al., "Electrodynamic Tethers in Space", Scientific American, Aug. 2004, 9 pages.

C. Covault, "Bigelow's Gamble", Aviation Week & Space Technology, Sep. 27, 2004, 8 pages.

Website printout: http://ssi.org/assets/images/ lunar-base.jpg, 1 page, Mar. 3, 2002.

Website printout: http://ssi.org/assets/images/ lander-wi-module.jpg, 1 page, Mar. 3, 2002.

Website printout: http://ssi.org/assets/images/ LEO-station.jpg, 1 page, Mar. 3, 2002.

Website printout: "Inflation Factor: Bigelow Readies Test Module", http://www.bigelowaerospace.com/ news.html, 2 pages, Mar. 2, 2002.

* cited by examiner

SPACE MANUFACTURING MODULE SYSTEM AND METHOD

CROSS-REFERENCE TO RELATED APPLICATION

This application claims priority from U.S. provisional application No. 60/606,410, filed Sep. 1, 2004.

TECHNICAL FIELD

The present device is related generally to manufacturing methods and systems and more specifically to manufacturing methods and systems in which the manufacturing occurs in outer space.

BACKGROUND

Outer space is an unforgiving environment. In outer space any facilities must be sufficiently self-sustaining. To achieve in greater part self sufficiency in space requires space based manufacturing capacity. This manufacturing could not only repair or replace parts of a space vehicle or space station but could also build components of larger structures needed for space exploration. To date the ability to manufacture in space is limited. This restricts space development and limits the development of habited stations beyond Earth. It is an object of the invention to provide a method and system for space manufacturing.

SUMMARY

The above objects have been achieved using a system for manufacturing in space that includes a first habitable spaced based module and a second space based manufacturing module joined to said first module. In the first module a control system allows control of manufacturing in the second module. In the second, manufacturing module a manufacturing robot and at least one manufacturing tool are controlled by the control system in the first module. A communication network allows connection of the first module to an Earth based network. An Earth based system then designs and engineers the component to be manufactured. A space based system performs safety checks prior to initiation of manufacturing operation. The manufacturing module may include a roller floor into which a panel floor having attached components is slid. The control module may have a system to monitor manufacturing, which may include windows, cameras, sensors. The modules may be joined end to end, with access doors allowing entrance. In addition, a hatch at the top of each module could allow attachment of other additional modules. These modules should be made to withstand solar radiation and may be made of strong fiber based materials (e.g., Kevlar®), titanium, and carbon-fiber. The manufacturing robot may be a track driven robot.

In an associated method, an spaced based astronaut identifies a component in need of fabrication. Specifications of this component are sent to an Earth based network. On Earth, the component is designed and engineered. The manufacturing data is then sent into space, where it is reviewed by a space based astronaut. After performing a safety review, the manufacturing instructions are transmitted to a manufacturing module, which then constructs the component. After manufacture, the component may be removed from the manufacturing module. The manufacturing step could utilize a manufacturing robot, that positions materials which are subsequently shaped, as by a laser or tapping tool. This manufacturing process may be monitored by cameras, sensors, or by observation through an observation window.

DETAILED DESCRIPTION

Figure 1:
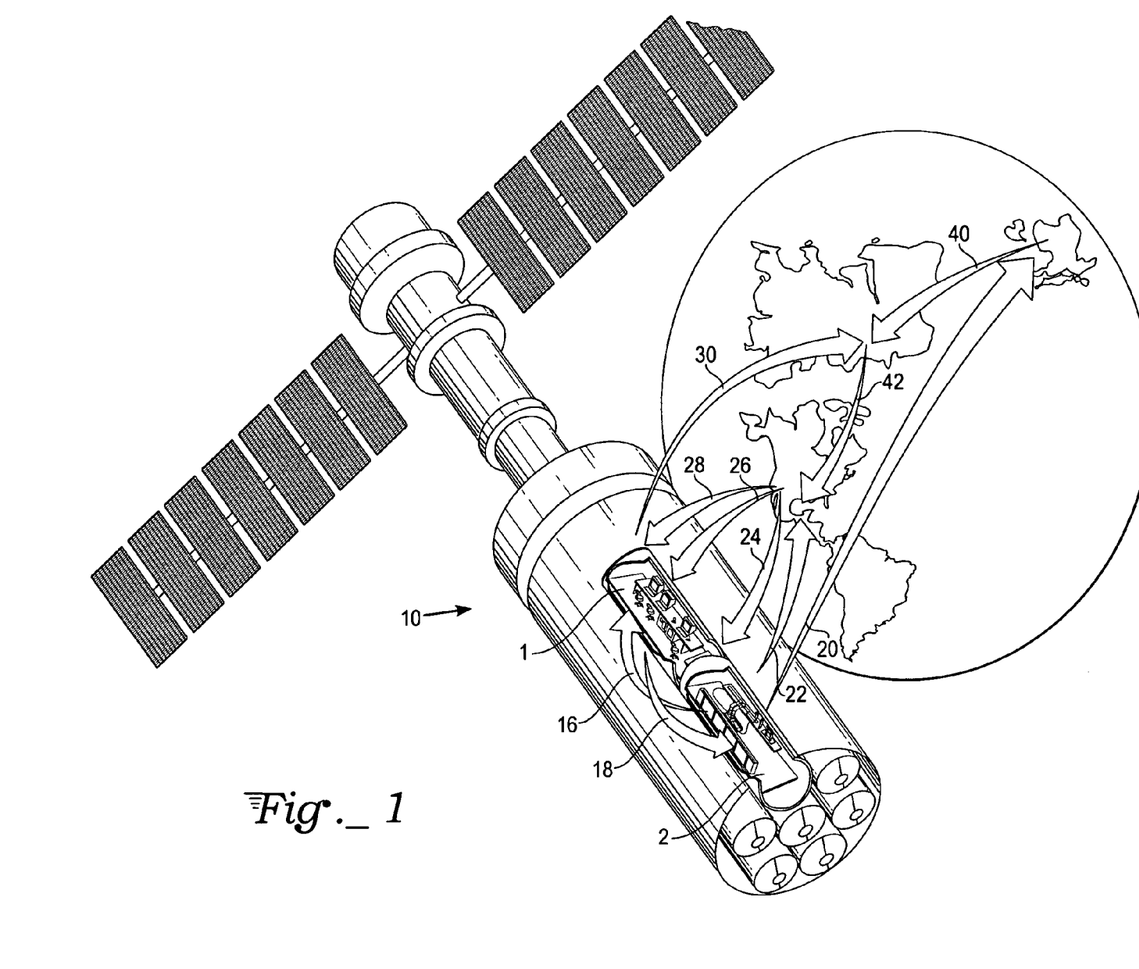
FIG. 1 is a plan view of an interactive manufacturing module in outer space shown in network communication with Earth bound systems.

With reference to FIG. 1, the space manufacturing module presently described includes a astronaut module control unit (AMCU) 1 and a space manufacturing modular unit (SMMU) 2. These may be part of a space based object 10. The space based modules are able to communicate and share data as indicated by arrows 16, 18. In addition, data might be sent by both the manufacturing units and the control unit. This exchange of information with Earth bound systems is indicated by arrows 20, 22, 24, 26, 28, and 30. In addition the Earth based allow systems may exchange information as shown by arrows 40, 42.

Computer integrated manufacturing (CIM) is an operation of the total manufacturing enterprise through the use of integrated systems and data communication. This method includes the application of such technologies as computer aided design (CAD), computer aided engineering (CAE), and computed aided manufacturing (CAM). The space manufacturing is generally initiated by the space based astronaut.

"Computer Integrated Manufacturing" (CIM) may be defined as the integration of the total manufacturing enterprise through the use of integrated systems and data communication coupled with a controlling management methodology that improves organizational and personnel efficiency. In this process the functions of design and manufacturing are rationalized and coordinated using computer communication and information technology. The entire manufacturing system from product definition and material selection to the transport of the final product is analyzed such that every operation element can be designed to contribute in the most efficient and effective way to achieve enterprise goals.

The term "space manufacturing" refers to production of components in outer space. Space manufacturing may be used to produce either new structures or repair existing structures.

"Computer Aided Design" (CAD) is the application of computer software including graphic software to aid or enhance the product design from conceptualization to documentation. CAD is an essential system in engineering design. When using CAD modeling software allows for automation of routine tasks increasing productivity by freeing the engineer to perform other tasks.

"Computer Aided Manufacturing" (CAM) is the system in which specialized hardware and software tools are used to automate an entire manufacturing process while coordinating the production line. This is integrated into the process planning, operation design, machine data generation, automated instrumentation, control, inventory, testing, quality control, and reporting. In short, CAM is effective use of computer technology in the planning management and control of production.

"Computer Aided Engineering" (CAE) is the analysis and evaluation of the engineering design using computer based techniques to calculate product operational, functional, and manufacturing parameters. CAE tools can include CAD, numeral control programming tools, fixture designing, quality control planning and process planning. This particular group of tools may act in concert with CAD and CAM. When integrated into an automated system this is generally referred to as computer aided process planning (CAPP).

The manufacturing model will be reliant on robotics to carry out critical functions in manufacturing. There will be an automatically controllable, reprogrammable, multi-purpose, manipulative machine having several reprogrammable axes. The robot may be either fixed in place or mobile as in the track based device shown in FIGS. 3 and 4. The robot can also act in concert with the video monitoring to allow real time feedback and motion control. The robot must be able to perform many different functions depending on the manufacturing method which needs to be effected.

Using computer implemented manufacturing allows comprehensive control of the manufacturing method. All aspects of the manufacturing enterprise are interconnected via a computer network.

CAM requires the integration of various software programs in a network environment. Continual updates and improvements of the software allow the leveraging of new technology into this environment. Computer aided design (CAD) is used for visualizing the concept. Computer aided engineering (CAE) is used to test the concept before building an item. Computer aided manufacturing (CAM) is used to configure the computer controlled equipment to allow form manufacturing of a component. Computer aided process planning (CAPP) is used to coordinate the order of operations and routings utilized when a variety of machine tools are used to make a single part.

Additional software tools include Statistical Quality Control Software (SQC) to detect when manufacturing equipment is going out of specification. SQC can then make needed adjustments to the manufacturing equipment (e.g., robots, welding tools, dye/tapping tools, etc.). Real Time Memory Resident Data Based Management System (RT/DBMS) allows production tools to stop and start within a very short time period. CIM allows these various tools to be tied together.

Figure 2:
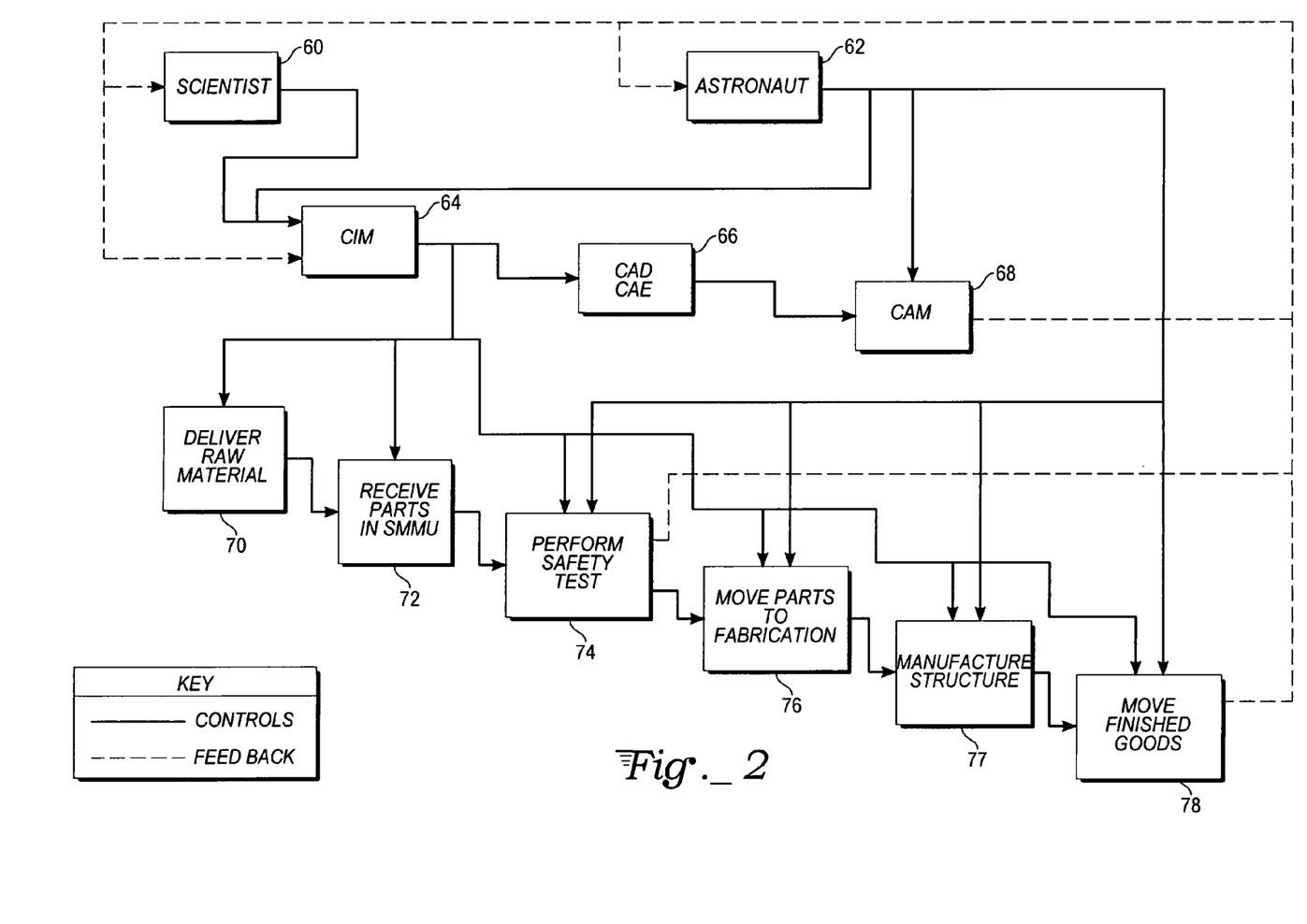
FIG. 2 is a manufacturing flow chart.

With reference to FIG. 2, the steps of the present method are shown in a flow chart. This invention implements a simplified CAM structure as shown in this figure. Initially the astronaut 62 will define the manufacturing need. In certain instances this may be done the scientist 60. The space based astronaut 62 and the Earth based scientist 60 work in concert to initiate the computer implemented manufacturing (box 64). The initial computerized steps of CAD and CAE (box 66) are Earth based. The steps may take place a number of different locations by a variety of Earth based personnel. In contrast CAM (box 68) which will include coordination of raw materials, manufacturing planning, and manufacturing specification will be space based and will be conducted by the astronauts.

The development of a new product usually starts with CAD modeling and goes in the direction of the arrows shown in the diagram. In the space based computer implemented manufacturing system there are inevitable time delays necessitated by communication between the space based system and Earth. If corrective action requires immediate attention, the astronaut may give local commands to the production process to create corrective action as the situation requires. The design and engineering plans for a variety of parts may be stored in a space based computer memory for simplified access. In this limited situation CAD and CAE processes will take place in space.

Once the design using CAD/CAE files data is completed, a CAM, Virtual Reality (VR) on Earth may verify the implementation of the design. The proven data would then be passed to spaced based CAM and the astronaut in the control unit.

In any manufacturing process the astronaut has final approval of production in space to control critical safety factors. The interaction between CAE and CAM occurs at the time of transfer of computer and numerical controlled (CNC) data being sent to the space based manufacturing robot. The CAM data for laser machining or other manufacturing method and material stock shall be incorporated into the CAE data. Referring again to FIG. 2, the actual manufacturing method includes the delivering of raw materials. Originally these materials are delivered from Earth. These parts are received into the space module air manufacturing unit (box 72). Preliminary safety tests (box 74) are carried out to ensure all the parts and the manufacturing methods conform to safety requirements. The necessary parts are moved from storage within the manufacturing unit to the fabrication location. In box 77 these parts are manufactured into a desired structure. This structure has been designed and the process engineered by Earth based systems. The finished goods are then moved to a desired location. At critical points there is feedback both from the CAM software and from various testing devices and software. These seen feedbacks shown in dotted line in FIG. 2. Both allow the CAM software to be implemented during manufacturing and provide feedback to both the Earth based scientists and the space based astronauts on safety test data and finished good production.

Figure 3:
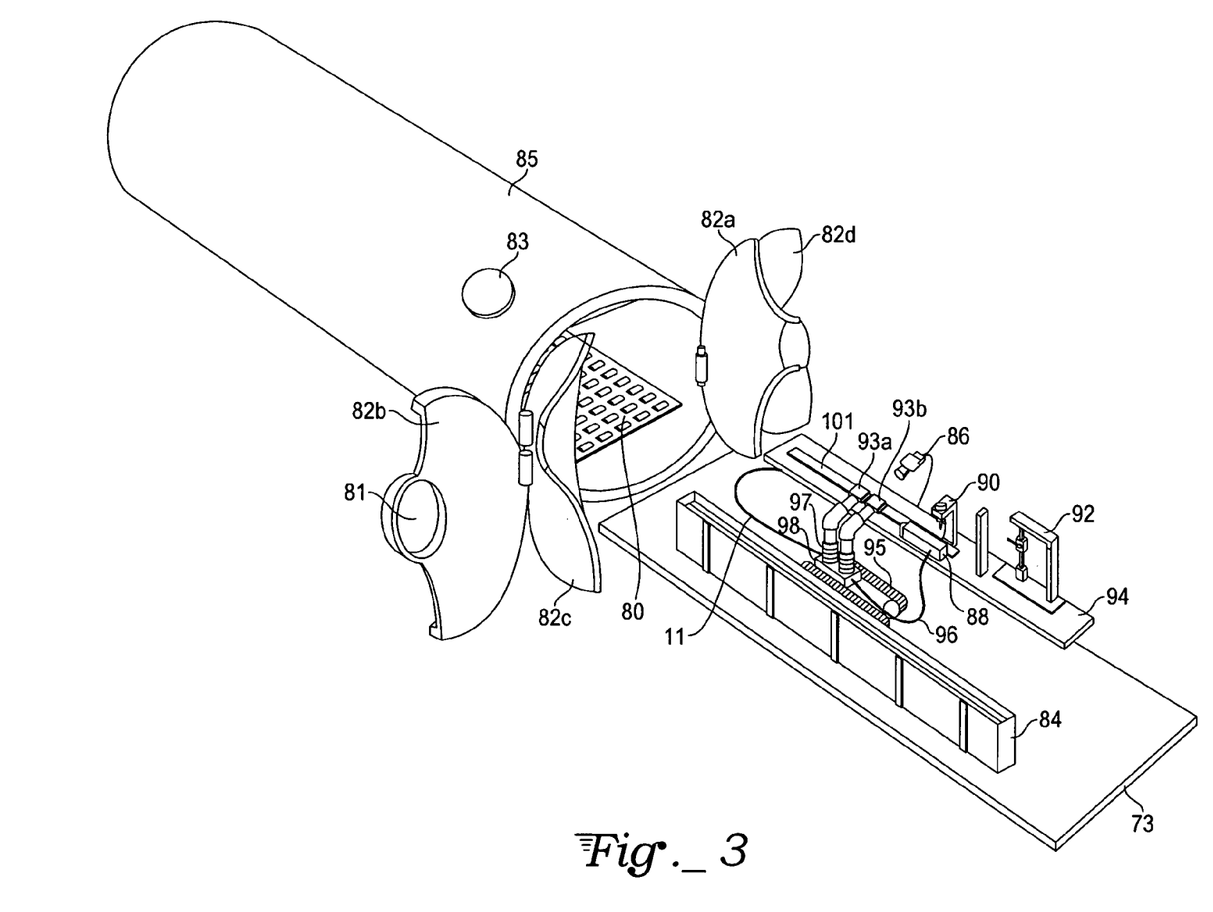
FIG. 3 is a perspective view of a manufacturing module.
Figure 4:
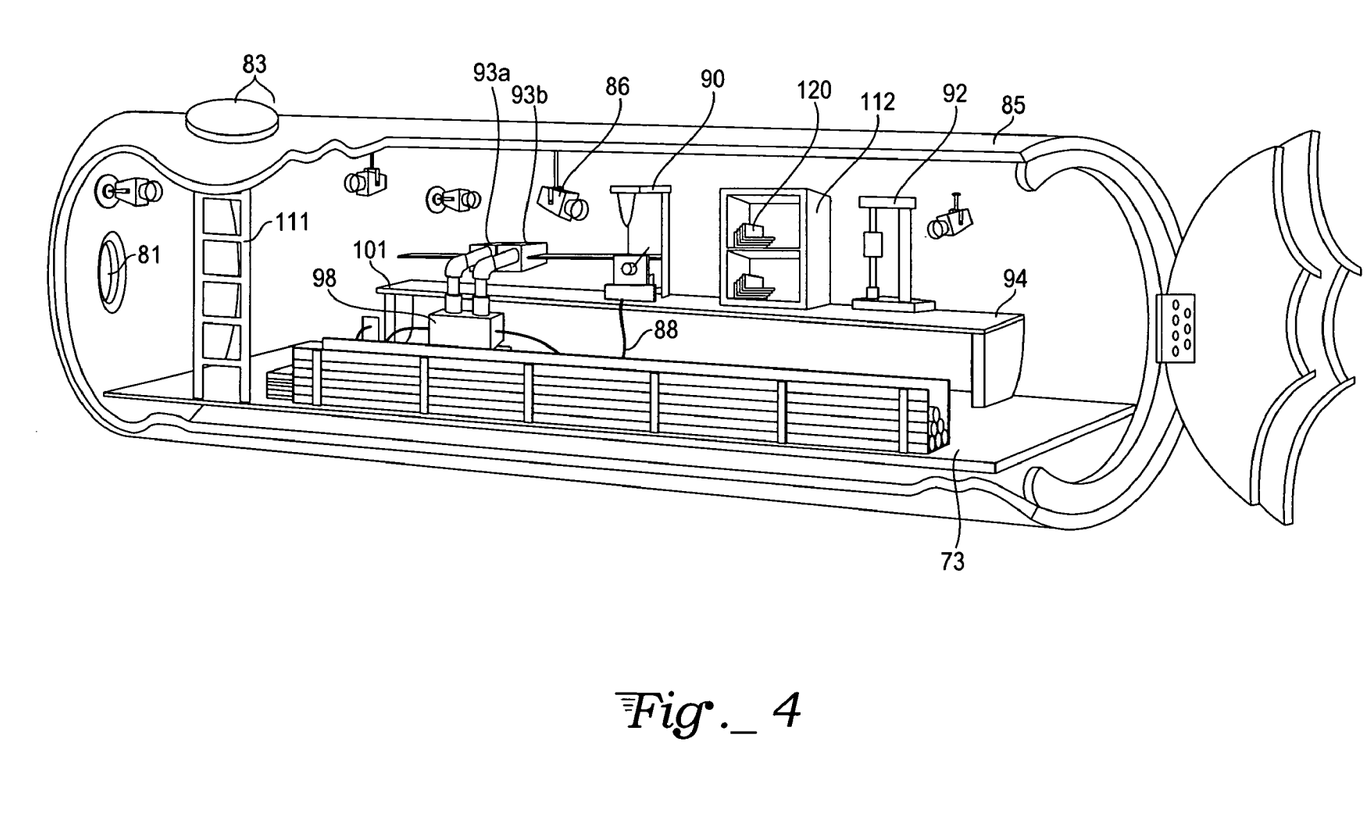
FIG. 4 is a side cut-away view of the manufacturing module of FIG. 3.

With reference to FIGS. 3 and 4, the space manufacturing module unit (SMMU) shows an exterior wall 85 having an access hatch 83. On the interior of the unit is a modular container for the manufacturing system. The modular floor system can be fitted into the unit to allow additional sections to be slid into the unit. In this example, floor panel section 73 could be slid over roller surface 80. Mounted on floor 73 is materials rack 84 that holds various construction materials. Located opposite rack 84 is manufacturing bench 94.

Mounted on bench 94 is laser tool 90 and a tapping/dye thread cutting tool 92. Lasers can both weld parts and cut parts. The lasers operate at high speeds and have low operating maintenance requirements. The laser cutting is a relatively efficient process, allowing cutting inn difficult to access areas. Because the laser is a light beam, it is relatively simple to shape the beam into various sizes and shapes without requiring tooling changes. Very small holes, as small as 0.1 mm may be manufactured. Since the laser exerts force on the part and is a very small spot, the technology is well suited to fabrication of precision parts, even from relatively delicate materials. Possible useful lasers include 3D Vanguard Systems, TRW's DP.Z3 3 kW High Brightness Diode-Pumped Industrial Laser, and TRW's 5 kW High Brightness Diode-Pumped Industrial Laser. To date, laser cutting tools have been unable to perform cutting of threads. A separate tool is likely required. Camera 86 is mounted to bench 94 to monitor work progress. The cameras in a manufacturing module may be motorized allowing different views to be observed. Control pack 88 provides control signals through wire 96 to robot 98. Wire 11 provides power to the track driven robot 98. Robot 98 is mounted on tracks 95 to allow the robot to move about the manufacturing module. Grippers 93a, 93b on robot 98 allow gripping of part 101. This allows the part 101 to be positioned relative to the tools within the manufacturing module during manufacturing. Expanders 97 on robot 98 allow the grippers 93a, 93b to be raised and lowered thereby raising and lowering the parts. Once the floor 73 has been inserted into the module doors 82c, 82a may be closed on a first hinge. Doors 82d, 82b seal over the initial set of doors providing a seal. Port hole 81 allows viewing into the manufacturing module.

The manufacturing module may be restricted in size, for example, by the current space shuttle usable cargo envelope. The cargo envelope is limited by supporting subsystems in the cargo bay payload volume. The payload envelope in the orbiter cargo bay measures 15 feet (4.6 m) diameter by 60 feet (18.4 m) long. A nominal 3 inch (76 mm) clearance between the payload envelope and the orbiter structure is provided to prevent orbiter deflection interference between orbiter and payload envelope. In addition, future space vehicles may have different dimensions. It is anticipated that next generation space delivery vehicles will be built commercial space delivery vehicles will be developed. In addition, presently available launch vehicles allow transport of modules of varying dimensions. Modules could be separately launched and joined in space.

In FIG. 4, completed components 120 are shown on rack 112. These parts may be moved by robot 98 to outer hatch 83 for use outside the manufacturing module.

Figure 6:
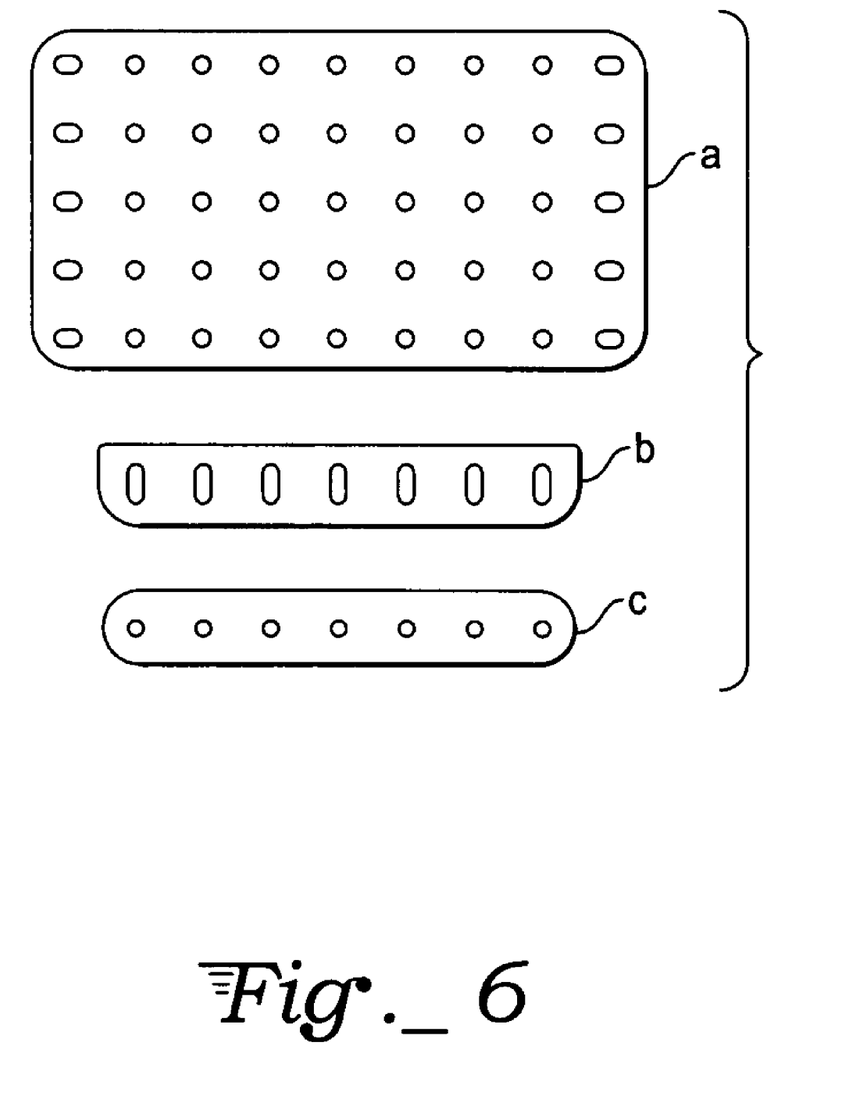
FIG. 6 is a set of manufactured components.

For example, in FIG. 6 the starting material a could be cut into parts b and c. The shape of the part, relief holes, and surface texture may all be shaped by the manufacturing tools.

Figure 5:
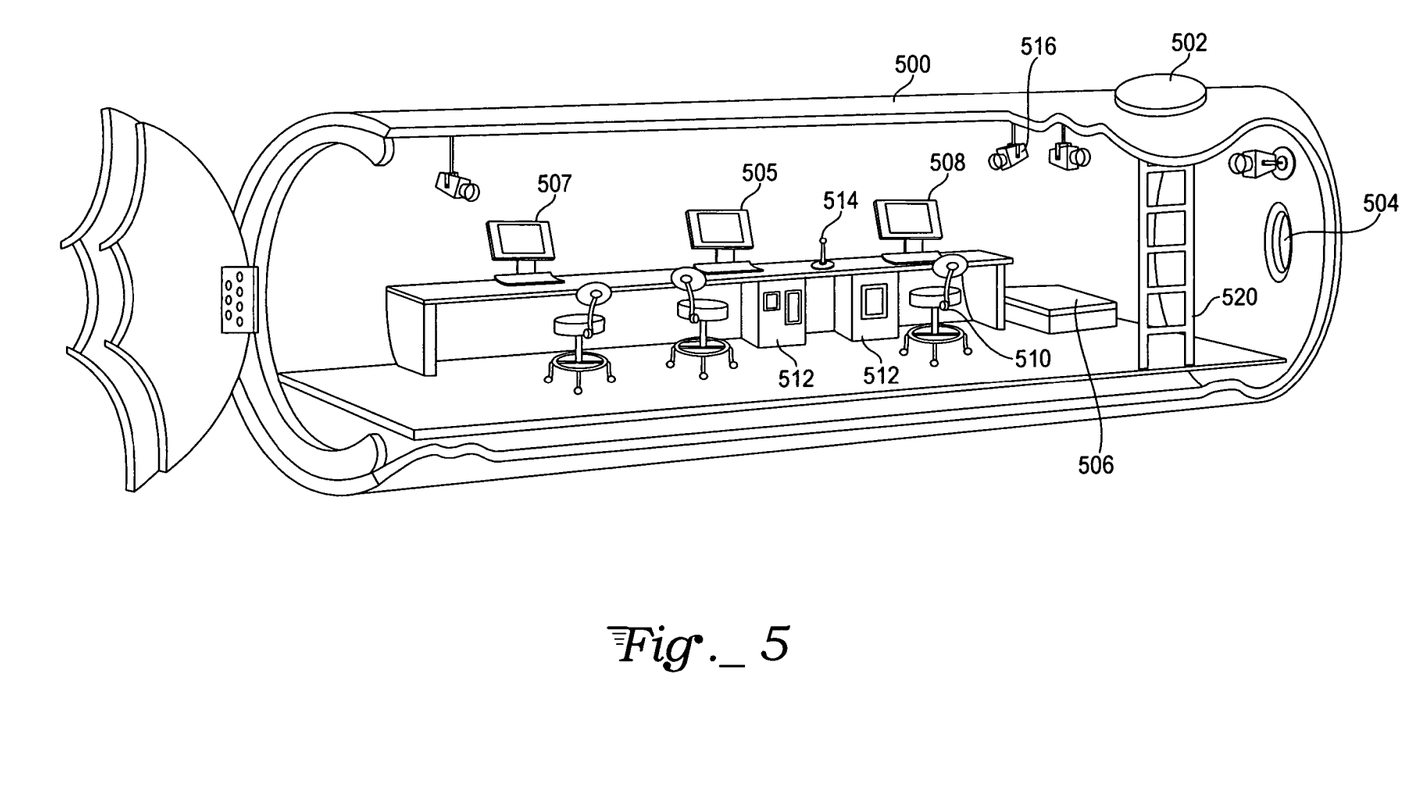
FIG. 5 is a side cut-away view of a control module.

The astronauts controlling the space manufacturing module unit (SMMU) will be in an astronaut module control unit (AMCU) as shown in FIG. 5, this unit will have a livable atmosphere which is not necessary for the manufacturing module. For example, carbon dioxide build up may be allowed in the manufacturing module if humans are not required to be in this module. In contrast, in the AMCU such build up will not be tolerated. A sleeping cot 506 in this unit allows astronauts to live in the unit as well as work. A ladder 520 allows access to a hatch 502. This hatch may be joined to another module unit or may access a space environment if provided with an air lock. The unit includes a number of computers 512 and monitors 508. These are configured to control the devices in the manufacturing unit. In addition a joystick 514 or other input/output devices may be used, for example, to control a robot in the manufacturing module. A observation window 504 may allow visual inspection either of the exterior of the control unit or of an adjoining manufacturing unit. The control unit is also configured with a network (e.g., local access network) and a communication system allowing communication with Earth based systems.

In one embodiment, the control unit includes three monitors. A first monitor 507 displays communication to and from the CAM engineer on Earth. The second monitor shows camera views from inside and outside the manufacturing unit. The third monitor provides information from the infrared camera in the manufacturing unit as well as displays data on vibration analysis and other machine analysis from the machine in process. Alternatively a single monitor could be used displaying different information in various quadrants.

The manufacturing astronaut preferably will have a virtual reality system to test and confirm the manufacturing process before this process begins. This will provide the final safety check for the manufacturing astronauts prior to commencing manufacturing. The manufacturing astronaut will have kinesthetic haptic feedback remote control of the track robot or any robot used outside of the space based vehicles or structures (as by joy stick 514). This may be established via a local area network. Also included in the control unit may be a hatch door 502 (which may include an air lock).

The need for manufacturing in space typically will occur in one or two situations. First, equipment failure requiring repair could occur. Second, a astronaut could recognize that a new piece of equipment needs to be fabricated. A manufacturing astronaut, possibly in conjunction with a space station commander, will identify the need and determine the degree of urgency for fabrication. That information will be communicated by a communication system on the space based device to engineers on Earth.

If the Earth engineers agree that the component piece of equipment needs to be manufactured the CIM engineer manager on Earth will communicate with engineers to perform the CAM/CAE/CAD design engineers to determine if it is feasible to manufacture the component in space. If authorization is given to fabricate the component CAE and CAD will be used to design the component and engineer the manufacturing of the component. Once an Earth based engineer gives a final approval for the design the CAM controlling engineer sends it to the space based control unit. The space based astronauts in the control unit will have final confirmation and authorization to send instructions to the manufacturing unit. The space based astronauts will check the design and complete a safety review as well as confirm the availabilities of materials on the manufacturing unit.

The astronaut in the control unit confirms that the automated systems in the manufacturing unit has the correct uncorrupted design data and gives the approval to begin CAM manufacturing. The automated system in the manufacturing unit then proceeds to manufacture the device. When the manufacturing operation is complete the automated systems signal the astronaut in the control unit. In addition they also send a signal to Earth based systems. The astronaut may then authorize an external robot to pick up the completed component for installation outside of the space craft.

The manufacturing astronaut and control unit will have responsibility for safety of the manufacturing process. Programs within the automated systems and other tools provide various safety features. These include automated systems to make sure that the manufacturing tools and other devices are performing within statistical quality control tolerances. In addition the cameras 86 shown in FIGS. 3 and 4, may include infrared cameras and vibration sensors to detect over heating or other anomalies. Safety warnings may be sent to astronauts in the control unit and to mission control on Earth. The astronaut will be able to override automated systems to control manufacturing in real time. Safety operations may include error recovery, process correction, and confirmation of corrections by a track driven robot. The manufacturing astronaut has controls at the manufacturing process to ensure that statistical safety boundaries are in place.

Manufacturing Challenges

Manufacturing in space faces several challenging operational requirements. These may include, but are not limited to: presence of power, presence of gravity, protection against thermal effects, preserving communication signal integrity, handling process gases, determining suitable manufacturing methods, raw materials inventory, safety, and reliability.

Power

It is estimated that a total power of about 10 KW will be sufficient to provide the required operating energy. A power subsystem generates power using a solar array nuclear generator, fuel cell, or other means. In one embodiment, the SMMU is partially covered by solar panel arrays as shown in FIG. 1. The required area of such a panel of solar arrays in related to the power, P, the solar constant, (1,367 W/m²), and the conversion efficiency of the solar-cell system.

$$A_a = \frac{P}{0.07*1367} \approx 0.01P$$

where a 7% array efficiency is considered. Furthermore, the mass of the planar array systems, with a specific performance of 25 W/kg is calculated based on Ma=0.04P to be 400 kg for a 10 KW power requirement. Rechargeable nickel-cadmium or nickel-hydrogen batteries may be used.

Gravity

For manufacturing in space, the need for gravity is different than that needed by personnel requiring a level of comfort in artificial gravity. The gravity is required to divert the debris generated in the manufacturing process towards a waste containment area. The artificial gravity can be developed through the rotation of the entire manufacturing module along its long axis. This would centrifugally drive debris to the walls, where it could be mechanically gathered. Alternatively artificial gravity can be developed through the electromagnetic field generation. In general, the rotation of an object about an axis is desirable for environments where large radial rotations are possible. This may generate gravity in the range of 0.035 g to 1 g. This level of gravity can be achieved through a maximum angular velocity of the SMMU of 4 rpm and a minimum tangential velocity of 6 m/sec.

It may desirable to group together a set of manufacturing modules to produce a manufacturing factory. In FIG. 1, modules 7a, 7b, 7c, 7d, 7e, 7f all may be manufacturing modules, which may be rotated as a unit. This would allow manufacturing of much larger structures. Access to each module could be through the ends of the module. Alternatively, the modules could pass manufactured components between the modules.

Thermal Protection

The purpose of a thermal control subsystem is to maintain the components of the SMMU within their allowed temperature limits during their operation. It is anticipated that the typical operating temperature range for all items in the SMMU will be −160 to 250 C for the exterior of the SMMU and −15 to +55 C for the interior. Standard thermal control subsystems are used to provide the required protection. These may include a variety of possible active components previously used in thermal control of space vehicles.

Communication Signal Integrity

Protection against the solar radiation and sun solar flares that can effect the operation of the AMCU/SMMU is of great importance. The manufacturing process can be interrupted due to, for example, solar flare activities. A suitable and protective solar radiation shield is required to assure the operation of the AMCU/SMMU. The AMCU/SMMU shell is fabricated of Titanium inner ½" thick shell covering a 3" space filled with reinforcing ribs with an outer second layer of Titanium ½" thick. The exterior is covered with ¼" thick layers of a strong fiber material such as Kevlar® and ½" thick Carbon-fiber to substantially reduce or eliminate hazardous radiation. The appropriate amount of shielding for spacecraft can be computed for the desired orbits as a function of shielding thickness. Shielding effectiveness (SE), expressed in decibels, is a measure of the reduction of the interfering field achieved by use of a material. Defined as $$SE = 10 \log\left(\frac{E_1}{E_0}\right)$$

where $E_1$ is the intensity of the electromagnetic field originally incident on the vehicle and $E_0$ is the intensity of the transmitted electromagnetic field or signal.

Attenuation of the field is achieved by a combination of absorption and reflection of the incident radiation; thus

SE=A+R+M

Where A is the loss due absorption, R is the loss due to reflection, and M is a correction factor that accounts for multiple reflections. When an electromagnetic wave passes through a material, it loses energy due to its interaction with the electrons and atoms in the material. This loss is given in terms of the initial wave intensity $E_i$ and at intensity $E_t$ at a distance t in the material (i.e., t is the thickness of the shield on the component) as $E_t=E_i^{(-t/L)}$ where L is the distance required for the incident wave to be attenuated to about 37% of the initial value. This is called the "skin depth" of the material. It is given by relation $$L = \sqrt{\frac{1}{\pi f \mu_0 \sigma}}$$

where f is the frequency of the electromagnetic wave (in Hertz), $\mu_0$ is the permeability of free space (=1.257*10⁻⁶ Hm⁻¹), and a is the electrical conductivity of the material. In the EMI shielding theory, it is customary to express L in terms of the relative permeability of the material $\mu_r$, (=permeability of material/$\mu_0$) and the relative electrical conductivity of the material $\sigma_r$, (=electrical conductivity of material/electrical conductivity of copper).

The Sun constantly emits solar wind as a flow of high-energy atomic particles emitted from its surface. Some of these high energy particles are of the ionizing type, but others are non-ionizing. The collision of the solar wind particles with the Earth's magnetic fields creates a bow shock region where these forces interact. Two special areas within this bow shock region are known as the Van Allen belts. These consist of electrons and ions (mostly protons) having energies greater than 30 keV and distributed non-uniformly within the magnetosphere. Space fights beyond the Earth's magnetosphere must be of limited duration to prevent harmful effects to the astronauts exposed to the Sun's powerful radiation without this natural shield. Such space flight missions beyond the Earth's magnetosphere must also be timed carefully so they occur during quiet periods in the Earth's cycle. During a solar storm, the ionizing radiation emitted from the Sun is much greater. The Earth rotates within the magnetosphere, which remains stationary. As the Earth rotates under the magnetosphere, a given spot on the planet's surface will experience a daily pattern of up and down fluctuation in the strength of the natural electromagnetic field. The magnetosphere shields the Earth from much of the Sun's radiation, especially the potentially harmful ionizing rays. The Earth's magnetic field is roughly dipolar that is, $B(R,A)=(1+\sin^2)^{1/2}B_0/R^3$ where B is the local magnetic field intensity, λ is the magnetic latitude, R is the radial distance measured in Earth radii ($R_E$) and $B_0$ is the magnetic field at the equator at the Earth's surface.

$$B_0 - B(R - R_E, \lambda = 0) = 0.30 \text{ gauss}$$

The electrical potential spacecraft or component is measured with respect to plasma is such that it is immersed where the net current flow is zero. That is the following currents must cancel each other: (1) the electron current from the plasma to the vehicle, (2) the ion current from the plasma to the vehicle, (3) the secondary electron current, (4) the backscattered electron current, an (5) the photoelectron current.

Because materials have varying secondary emission coefficients and photoelectron currents, their equilibrium potentials also differ. An electrostatic arc occurs if the electric field exceeds the breakdown field along the surface of the material, through the material, or between adjacent materials. Electromagnetic interference, EMI, from such arcs can cause spacecraft to operate erratically. In the Earth's upper atmosphere, the interaction between the solar wind particles and the magnetosphere generates very large electrical currents, often with levels in the billions of watts range. This level is much larger than virtually all electrical sources created by humans.

Manufacturing Methods

The manufacturing methods used in space will be limited due to availability of physical space within the SMMU, the availability of the required power, and the need for gases for processes. The machine's hardware must be as simple as possible so it does not have to be continually upgraded. The hardware would take up valuable cargo space in the shuttle or the delivery vehicle. The cargo loading area in the space vehicle must be reserved for the materials and supplies needed in the manufacturing processes. Updating the control software can be transmitted from Earth to the spaced based system. Using lasers for the majority of the machining and cutting process eliminates the need for carrying alternative process equipment. Machining lasers have significant advantages for space manufacturing. The laser machining process will provide capabilities to cut materials, drill holes at selectable size and shape, mill, weld steel and bond metals. One appropriate laser unit for such operation is a Diode-Pumped Industrial Laser (DPIL).

A High Brightness 3 KW DPIL unit has proven to cut 10-12 millimeter thick 70-50 T3 aluminum plate at 1 meter per second a using 1200-Watt laser. Such unit has also demonstrated the capability of laser welding of metal plates of up to 25.4 millimeter thick on 2219 aluminum. Such a laser system requires a power consumption level of 240 VAC, 12.5 KVA, 50/60 Hz with 3 phase power. Tests have been conducted using a 5 kW High Brightness Industrial Laser cut 50 millimeter thick aluminum 70-50 T3 plate at 1 meter per second using 1200 Watts. A Diode-Pumped Industrial Laser may require argon gas to operate more effectively. NASA has tested and reported by via robotic space probes that argon gas can be found in the solar system locations such as Mars, Titan, Saturn's largest Moon and available on comets such as Hale-Bobb.

Space Safety

Corrective action may require the astronaut to give immediate attention to damage or breakage of the space vehicle. The astronaut will give local commands to the production processes and take corrective action as the situation warrants on the space vehicle. The astronaut shall have the final say and approval of production in space due to critical safety factors.

CIM merges all aspects of manufacturing into one integrated global network. The benefits of CIM include: efficient manufacturing operations based on accurate, real-time monitoring and analysis of process control data, improved quality due to more precise analysis and manufacturing control, and increased environmental and safely controls. While not all of these CIM benefits apply to manufacturing in space, many are applicable.

The manufacturing astronaut will simulate via a virtual reality system, to test and confirm before any machining process operation or repair is carried out. This will provide the final safety check for the manufacturing astronaut to proceed. The space station commander and the manufacturing astronaut in charge of the SMMU will have the final confirmation. They will check off the design for safety factors as well as confirm the availability of materials on the SMMU. The astronaut in the AMCU confirms that the robot and other machining in the SMMU have the same uncorrupted data and gives the approval to begin CAM manufacturing. The manufacturing astronaut has the responsibility to ensure that the AMCU and the SMMU have the same uncorrupted data. The astronaut also ensures that the machining operation can be carried out with reasonable statistical safety boundaries.

Safety systems by which the astronaut would be warned of malfunctions in the manufacturing process are of critical concern. These concerns encompass local communication between the AMCU and the SMMU, as well as the greater CIM communication structure. The SMMU/AMCU contains many factors to address safety. These include human/machining center robotics, a human/robot interface, and an error recovery and process change system. In addition there is an overall feedback system that is designed to respond quickly to out of statistical tolerance bounds, or program failure. There are a variety of systems: including system response, an escape system, pressurization system, and visual feedback with camera and rapid assembly/disassembly.

Stage One situations would be out-of-tolerance specifications that signal problems in the machining process. Radiation causing deterioration and solar flares is a noise factor that could be a safety concern due to the distortion and corruption of signal communication. Interference could be minimized by calculating the occurrence of solar flares and ceasing work during that time, thus insulating the robots and shielding the SMMU/AMCU workstation as best as can be feasibly accomplished. Cabin pressure would be a concern should the astronaut need to initiate corrective action. The machining work cell vibration analysis would measure machining tolerances and identify out-of-statistical tolerance bounds by sending a warning light and sound to the astronaut personnel computer interface.

Stage Two situations would include the information that the robot failed to make corrective action. The track robot would be equipped with an infrared camera to notify the astronaut of overheating situations outside statistical tolerance bounds and a potential damage situation. The astronaut would override the local sub systems to stop the robot and in turn would stop the machining process. The astronaut would inform Mission Control of problems and, at the astronauts' discretion, investigate and take corrective action.

Stage Three situations include fire and/or explosion. The Forth stage situation would be ejection of the SMMU by the manufacturing astronaut in the AMCU.

Reliability of Repairable Systems

The reliability of products depends not only on their dependability but on their repairability. It is important that products are designed in such a way that their gradual and potential failures can be easily detected and eliminated in due time, and that the detected damages can be effectively corrected. The reliability of products is characterized, first of all, by their availability—the ability of an a product to perform its required function at the given time or over a stated period of item under combined aspects of its reliability maintainability, and maintenance support.

A high level of reliability can be achieved either by sufficiently high levels of dependability or by high levels of repairability, or by the most feasible combination of both. The mean time-between-failures (MTBF) of a repairable item is defined for a stated period of its life as the mean value of the between consecutive failures. The time is evaluated as a ration of the cumulative observed time to the number of failures under stated conditions. The stationary failure flow is characterized by the mean number of failures per unit time:

$$\gamma = \frac{1}{t}$$

Here t is the mean time to failure item and defined as the total corrective maintenance item divided by the total number of corrective maintenance actions during a given period of time. In spacecraft that employ extensive redundancy there can be a significant difference between these two reliability metrics. Mission reliability is the more important concept, and when we use reliability without a qualifier, it always means mission reliability. The elementary expression for the reliability of a single item, not subject to wear out failures, is $$R = e^{-\lambda t}$$

where $\lambda$ is the failure rate and t is the time. Here R, is the probability that item will operate without failure for time t. At this point we recognize only two outcomes: success and failure, and therefore the probability of failure, F, is given by $$F = 1 - R$$

For a spacecraft made up of non-redundant elements, all equally essential for spacecraft operation, the system (or series) reliability, Rs, or success probability is computed as $$R = \prod_i^n R_1 = e^{-\Sigma \lambda_i t}$$

where $R_i$ (i=1 ... n) is the reliability and $\lambda_i$ the failure rate of the individual elements. Probabilities ($\lambda t$) less than 0.1 or reliability greater than 0.9, the following approximation is frequently used where a system consist of n elements in parallel, and $$e^{-\lambda t} = 1 - \lambda_t$$

each of these elements can by itself satisfy the requirements, the parallel (or redundant) reliability, RP, is given by $$R_P = 1 - \prod_i^n (1 - R_i)$$

where the reliability of the parallel elements is equal, say Rn, the above simplifies to $$R_P = 1 - (1 - R_a \lambda)^n$$

In terrestrial applications it is customary to distinguish between active and quiescent (dormant) failure rates, the latter being about one-tenth of the active rates. The reduction accounts for the absence of electrical stress when a component is not energized. However, the high reliability requirements of the space environment cause components to be derated so the failure probability due to electrical stresses even in the active mode is quite small. The distinction between active and quiescent failure rates in therefore much less important for spacecraft applications. Design life, the intended operational time on orbit is an important parameter for the reliability program. It determines the amount of consumables that must be provided and establishes quality and test reliability calculated at the designing life and the mission success probability. The first measure of reliability, the expected life defined as the mean mission duration or MMD, given by:

$$MMD = \int T dR$$

where T represents (time) and dR is increment in reliability. MMD is a frequently used figure of merit for spacecraft reliability improvement programs. The second measure of reliability is the limiting availability, A, given by $$A = \lim_{t \to \infty} A(t)$$

Regardless of the probability distribution the limiting availability is often easy to obtain.

$$A = \frac{E(T_i)}{E(T_i) + E(D_1)} = \frac{MTTF}{MTTF + MTTR}$$

Suppose $T_i$ is an exponential random variable having failure rate $\lambda$ and $D_i$ is an exponential random variable having repair rate $\mu$ then.

$$A(t) = \frac{\mu}{\lambda + \mu} + \frac{\lambda}{\lambda + \mu} e^{-(\lambda + \mu)t}$$

where for a long period of time, $t \to \infty$, system availability is given by $$A = \frac{\mu}{\lambda + \mu}$$

The system availability for a system comprised of independent components is given by $A = A_1 A_{23}$ where $A_1$ is the availability of components 1 and $A_{23}$ is the system availability of two components 2 and 3 defined by, $$A_{23} = 1 - 1(1 - A_2)(1 - A_3)$$

Benefits

The benefits realized through this manufacturing in space vision are significant. The immediate benefit is the in situ repair and fabrication "machine shop" in space for making components and systems. Such a facility can be a key component in saving lives and/or providing a greater opportunity for survivability for astronauts, and space travelers during a mission. Through this concept of manufacturing in space, very large scale space structures call be built thus reducing the cost for launch of such structures.

The SMMU model and its flexible platform can be configured into various research facilities such as a surgical unit, a biological research unit, or a material science laboratory leading researchers toward improving the quality of life for mankind.

Such SMMU can be used as a space port and a critical means in helping to colonize the space for future exploration.

What is claimed is:

1. A system for machining, in space comprising:
   a first space based module allowing human habitation;
   a control system in said first space based module;
   a second space based module joined to said first space based module and having a machining system therein with at least one tool of a type for machining to fabricate a finished part within the second space based module from a starting material, with the tool automatically controlled at least in part by said control system in accord with design and engineering data received from the Earth based communication center by the first space based module and approved by humans in the first space based module;
   a robotic device in said second space based module operative with the machining tool and controlled at least in part by said control system;
   an Earth based communication center and a communication network connecting said first space based module to the Earth based communication center, the center having means for designing and engineering said part to be fabricated, with generated design and engineering data and, after approval by humans in the first space based module, communicated to said control system from the communication center; and
   a space based means associated with the control system configured to receive from the Earth based communication center said generated design and engineering data for fabricating said part using the tool and the starting material in the second space based module equipped with the machining system, wherein said second space based module includes a floor slideable in said second module and having a materials rack mounted thereon and wherein a floor of said second space based module includes floor rollers.

2. The system of claim 1, wherein said first module and said second module are joined end to end, wherein an observation window is disposed at the joined ends allowing visual inspection of said second module.

3. The system of claim 1, wherein said second module includes a track driven robot.

4. The system of claim 1, further including a plurality of additional machining modules joined together to form a production factory.

5. The system of claim 1, wherein said tool is selected from the group consisting of a laser and a drill.

6. The system of claim 1, wherein said first space based module has a means for visually monitoring an interior of said second space based module.

7. The system of claim 6, wherein said means for visually monitoring includes video cameras.

8. A method for space based machining comprising:
   providing a machine tool production unit joined to a space based habitable module, wherein said space based module includes a floor slideable in said module and having a materials rack mounted thereon and wherein said floor of the space passed module included floor rollers;
   identifying in space a component in urgent need of fabrication from a raw material in response to an emergency;
   sending component information from space to an Earth based network;
   designing and engineering said component on Earth using Computer Aided Design, and Computer Aided Engineering;
   transmitting component engineering data from Earth to space derived from the Computer Aided Design and Computer Aided Engineering;
   reviewing by humans in space said component engineering data;
   performing a safety review by humans in space to ensure said component may be produced safely;
   transmitting in space, after approval by humans in space performing the safety review, the component engineering data from a control unit to the machine tool production unit; and
   automatically fabricating said component in said machine tool production unit using the raw material and under control by the component engineering data.

9. The process of claim 8, further comprising removing said component from said machine tool production unit.

10. The process of claim 8, wherein said fabricating step is monitored by vibration sensors.

11. The process of claim 8, wherein said step of fabricating said component includes removing raw materials from a storage area in the machine tool production unit by a robot, positioning the raw materials using said robot, and shaping, machining, forming and constructing the raw materials so as to produce a completed machine element component or part.

12. The process of claim 11, wherein said shaping is effected by a machine tool selected from a group consisting of a laser and a tapping/dye cutting tool.

13. The process of claim 8, wherein said fabricating step is monitored by at least one camera.

14. The process of claim 13, wherein said fabricating step is monitored by an infrared camera.

* * * * *

UNITED STATES PATENT AND TRADEMARK OFFICE
CERTIFICATE OF CORRECTION

PATENT NO. : 7,988,096 B2  
APPLICATION NO. : 11/217649  
DATED : August 2, 2011  
INVENTOR(S) : Peter J. Humphries Page 1 of 1

It is certified that error appears in the above-identified patent and that said Letters Patent is hereby corrected as shown below:

Column 8, line 35, the symbol after the word "and" should read: $\sigma$

Column 8, line 66, equation should read: $B(R, \lambda) = (1 + \sin^2 \lambda)^{1/2} B_0 / R^3$ Signed and Sealed this  
Twenty-fourth Day of July, 2012

David J. Kappos  
*Director of the United States Patent and Trademark Office*